United States Patent

Buller et al.

(10) Patent No.: US 6,449,145 B1
(45) Date of Patent: Sep. 10, 2002

(54) RETENTION HANGER FOR NETWORK COMPUTER

(75) Inventors: M. Lawrence Buller, Cedar Park; Mark Alan Jacks, Austin; John Richard Pugley, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 09/627,031

(22) Filed: Jul. 27, 2000

(51) Int. Cl.⁷ .................................................. G06F 1/16
(52) U.S. Cl. ...................... 361/683; 361/679; 361/686; 312/223.1; 312/223.2; 312/223.3
(58) Field of Search .................................. 361/679, 681, 361/682, 683, 686, 724–727; 312/138.1, 139, 139.1, 139.2, 215, 216, 218, 222, 293.1–293.3, 294, 301, 223.1–223.3; 340/815.51, 815.86, 815.49, 825.44

(56) References Cited

U.S. PATENT DOCUMENTS

| 5,428,350 A | * | 6/1995 | Kurcbart et al. | ....... 340/825.44 |
| 5,502,616 A | * | 3/1996 | Maguire, Jr. | ................. 361/681 |
| 5,515,303 A | * | 5/1996 | Cargin, Jr. et al. | ...... 364/708.1 |
| 5,569,895 A | * | 10/1996 | Lynch et al. | .................. 235/1 R |
| 5,751,548 A | * | 5/1998 | Hall et al. | .................. 361/686 |

* cited by examiner

Primary Examiner—Darren Schuberg
Assistant Examiner—Yean-Hsi Chang
(74) Attorney, Agent, or Firm—Joseph P. Lally; J. Bruce Schelkopf; Casimer K. Salys

(57) ABSTRACT

A retention apparatus (hanger) suitable for use with a data processing system that includes a data processing box and a video display is disclosed. The hanger includes a pair of substantially parallel major sides and a pair of substantially parallel minor sides that connect the pair of major sides at their respective ends to define a substantially rectangular aperture suitable for receiving the data processing box. The hanger further includes a hook that has a base portion and a tooth portion connected at an end of the base portion. The base portion extends substantially from and in line with one of the minor sides such that the tooth portion is laterally displaced from one of the major sides with the tooth oriented towards the other minor side. In this configuration the hook enables the hanger to suspend from a groove in the display monitor with the first major side of the hanger in close proximity to a rear face of the video display. The hanger may further include a latch located proximal to the second minor side and in close proximity to the rear face of the display monitor when the hanger suspends from the hook. The latch is preferably enabled to secure the hanger to the video display and may include a tongue affixed to a base piece where the base piece is movably affixed to the hanger such that movement of the hanger base piece when the hanger is in close proximity to the rear face of the display monitor facilitates snapping the tongue into a groove in the rear face of the video display. An extension flange affixed to the latch base piece may facilitate operation of the latch. Cable management means, such as a cable hook, may be affixed to the second major side of the hanger. The hanger may include bumper protrusions to maintain separation between the data processing box and the display monitor when the data processing box is received within the hanger and the hanger is suspended from the groove in the video display.

17 Claims, 2 Drawing Sheets

RETENTION HANGER FOR NETWORK COMPUTER

BACKGROUND

1. Field of the Present Invention

The present invention generally relates to computing devices and more particularly to a structure for supporting a computing device such as a network computer.

2. History of Related Art

In the field of microprocessor based data processing systems, traditional desktop machines typically include, at a minimum, a box containing the power supply, processor, and supporting devices, a display device such as a video monitor, a keyboard, and a pointing device such as a mouse. Each of these components typically occupies a significant area of the user's desk or floor space and may result in an undesirably cluttered or crowded appearance in the user's home or office. In some environments, the area required for each component (the component's "footprint") may be a constraining factor in the design of a workspace. It is therefore almost universally desirable to minimize the footprint of each component in a system.

With the advent of client-server applications, distributed databases, and local area networks, network computers are becoming increasingly prevalent as a viable, low cost alternative to conventional desktop and laptop machines. Network computers, a term which applies broadly to a wide variety of devices optimized for use in a computer network, are typically smaller, cheaper, and consume less power than traditional desktop machines. In many cases, the cost and size of a network computer is minimized by the elimination of permanent mass local storage from the machine under the assumption that the network computer is connected to a computer network that includes one or more distributed mass storage devices which are accessible to the network computer via the network. The lack of a hard disk coupled with advances in semiconductor technology that have resulted in smaller and smaller integrated circuits make it possible to manufacture a network data processing box or thin client that is considerably smaller than conventional desktop machines. The network computer user is, nevertheless, required to find adequate desktop space for the box, display terminal, keyboard, and mouse.

In an effort to address the footprint problem, some manufacturers have attempted to integrate the network computer with the monitor within the same box so that the two components comprise only a single footprint. Integrating the monitor with the computer, however, requires significant development and tooling expense. In addition, the two components do not integrate well from a marketing perspective because the failure rates for the two components are different and because users tend to require improved computer performance more frequently than they require improved monitor performance. It would therefore be highly desirable to implement an apparatus enabling a user to minimize the footprint of a network computer. It would be still further desirable if the implemented solution was inexpensive, reliable, unobtrusive, and integrated well with existing data processing devices.

SUMMARY OF THE INVENTION

The problems identified above are in large part addressed by a retention apparatus (hanger) as disclosed herein that is suitable for use with a data processing system that includes a data processing box and a video display as disclosed. The hanger includes a pair of substantially parallel major sides and a pair of substantially parallel minor sides that connect the pair of major sides at their respective ends to define a substantially rectangular aperture suitable for receiving the data processing box. The hanger further includes a hook that has a base portion and a tooth portion connected at an end of the base portion. The base portion extends substantially from and in line with one of the minor sides such that the tooth portion is laterally displaced from one of the major sides with the tooth oriented towards the other minor side. In this configuration the hook enables the hanger to suspend from a groove in the display monitor with the first major side of the hanger in close proximity to a rear face of the video display. The hanger may further include a latch located proximal to the second minor side and in close proximity to the rear face of the display monitor when the hanger suspends from the hook. The latch is preferably enabled to secure the hanger to the video display and may include a tongue affixed to a base piece where the base piece is movably affixed to the hanger such that movement of the hanger base piece when the hanger is in close proximity to the rear face of the display monitor facilitates snapping the tongue into a groove in the rear face of the video display. An extension flange affixed to the latch base piece may facilitate operation of the latch. Cable management means, such as a cable hook, may be affixed to the second major side of the hanger. The hanger may include bumper protrusions to maintain separation between the data processing box and the display monitor when the data processing box is received within the hanger and the hanger is suspended from the groove in the video display.

BRIEF DESCRIPTION OF THE DRAWINGS

Other objects and advantages of the invention will become apparent upon reading the following detailed description and upon reference to the accompanying drawings in which.

Figure 1:
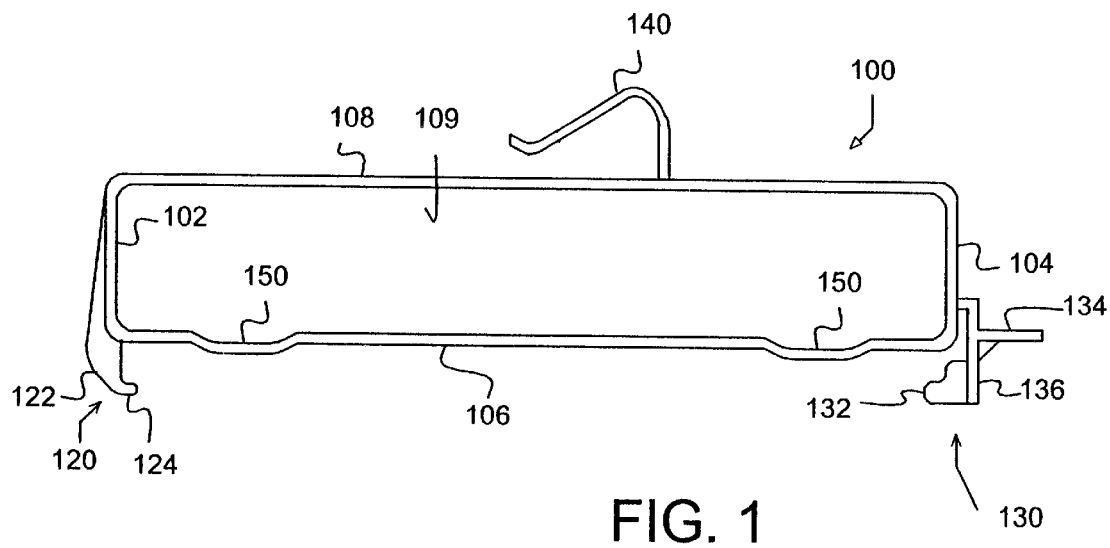
FIG. 1 is a diagram of a retention hanger according to one embodiment of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 illustrates an embodiment of a retention hanger 100 according to one embodiment of the present invention. Retention hanger 100 is suitable for receiving a substantially rectangular box, such as a data processing system box. In addition, hanger 100 includes a mechanism enabling it to suspend from a properly configured surface, such as the plastic grid structure typically found on the backside of a display monitor. Using two or more such hangers, the invention is suitable for suspending a data processing box of a computer system in close proximity to the backside of a display monitor such that the data processing box occupies zero footprint on the user's desktop.

As depicted in FIG. 1, hanger 100 includes a first minor side 102 and a second minor side 104. Minor sides 102 and 104 are typically substantially parallel to each other. The minor sides 102 and 104 are connected at their ends to a first major side 106 and a second major side 108. The sides of hanger 100 defined a substantially rectangular aperture 109 that is suitable for receiving a substantially rectangular box such as the system box of a data processing system.

Hanger 100 as depicted in FIG. 1 includes a hook 120 that extends from first minor side 102. The depicted embodiment of hook 120 includes a base piece 122 and a tooth 124. Base piece 122 extends from first minor side 102 to beyond first major side 106 such that tooth 124 is laterally displaced from first major side 106. (In the orientation of FIG. 1, lateral displacement refers to up/down displacement). Tooth 124 is oriented pointing in the direction of second minor side 104.

Hook 120 enables hanger 100 to be suspended from a surface that includes a groove for receiving tooth 124. In one embodiment, the dimensions of hook 120 enable tooth 124 to be received within a groove of a display monitor cabinet with first major side 106 of hanger 100 in close proximity to a rear surface of the display monitor cabinet. In this configuration, hanger 100 can be suspended from a display monitor cabinet with the first major side in contact or in close proximity to the rear surface of the display.

In the depicted embodiment, hanger 100 includes a mechanism for securing hanger 100 to the display monitor cabinet with a latch 130. In the depicted embodiment latch 130 includes a tongue portion 132 affixed to a base piece 136. The base piece 136 is attached to second minor side 104. Preferably, base piece 136 is attached to second minor side 104 such that base piece 136 can be moved slightly with respect to second minor side 104 to engage and disengage tongue 132 from an appropriately configured groove in the rear face of the display monitor cabinet. Latch 130 as depicted in FIG. 1 includes an extension flange 134 that facilitates the movement of base piece 136 to engage and disengage tongue 132 from the display monitor cabinet groove.

Hanger 100 may include, as shown in FIG. 1, a hook 140 that extends from the second major side 108 of hanger 100 to facilitate cable management. When hanger 100 is properly attached in close proximity to the rear face of the display monitor cabinet, second major side 108 is facing away from the display monitor and the hook 140 is oriented upwards. In this configuration, the hook 140 provides integrated means for bundling cables from the display monitor and data processing box.

First major side 106 of hanger 100 as depicted in FIG. 1 includes a pair of bumper protrusions 150. Bumper protrusions 150 locally extend hanger 100 beyond the rectangular aperture defined by the major and minor sides. When hanger 100 is suspended on the rear surface of a display monitor cabinet by hook 120 with latch 130 engaged, the bumper protrusions 150 maintain separation between the rear surface of the display monitor cabinet and a data processing box received within hanger 100. The small separation provided by bumpers 150 facilitates air flow between the display monitor unit and the data processing box and helps prevent mechanical contact between the display and the data processing box.

Figure 2:
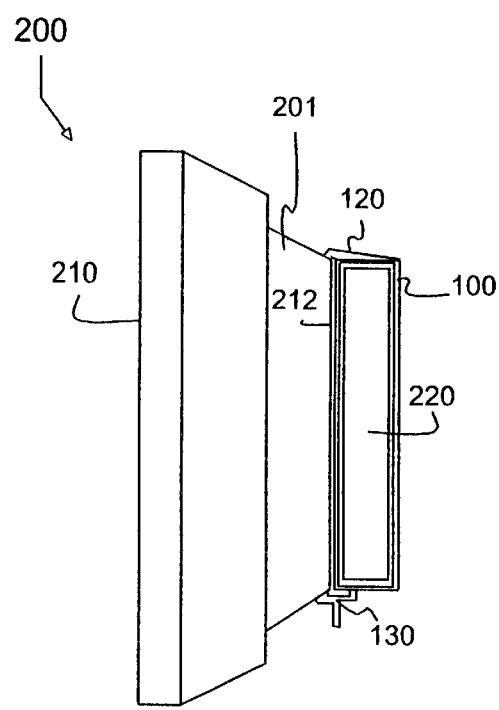
FIG. 2 illustrates the retention hanger of FIG. 1 in use with a data processing system.

Turning now to FIG. 2, data processing system 200 according to one embodiment of the present invention is depicted. In the depicted embodiment, data processing system 200 includes a display monitor 210 and a data processing box 220. Display monitor 210 may comprise a flat panel display, a CRT display, or other suitable display type. An exemplary display suitable for use as display monitor is the T55 15" flat panel display from IBM Corporation. Display monitor 210 typically includes a cabinet 201 in which a plurality of grooves or slots (not depicted) are formed to facilitate heat dissipation.

The data processing box 220 typically includes one or more microprocessors such as the PowerPC® processor from IBM Corporation, a system memory, and suitable peripheral devices to enable the processor to execute computer software residing in the system memory. The data processing box may be implemented as a thin client or network computer in which resources such as permanent (non-volatile) storage are substantially reduced or eliminated to reduce cost and lower power consumption. Exemplary data processing boxes include the Network Station family of network computers from IBM Corporation.

Figure 3:
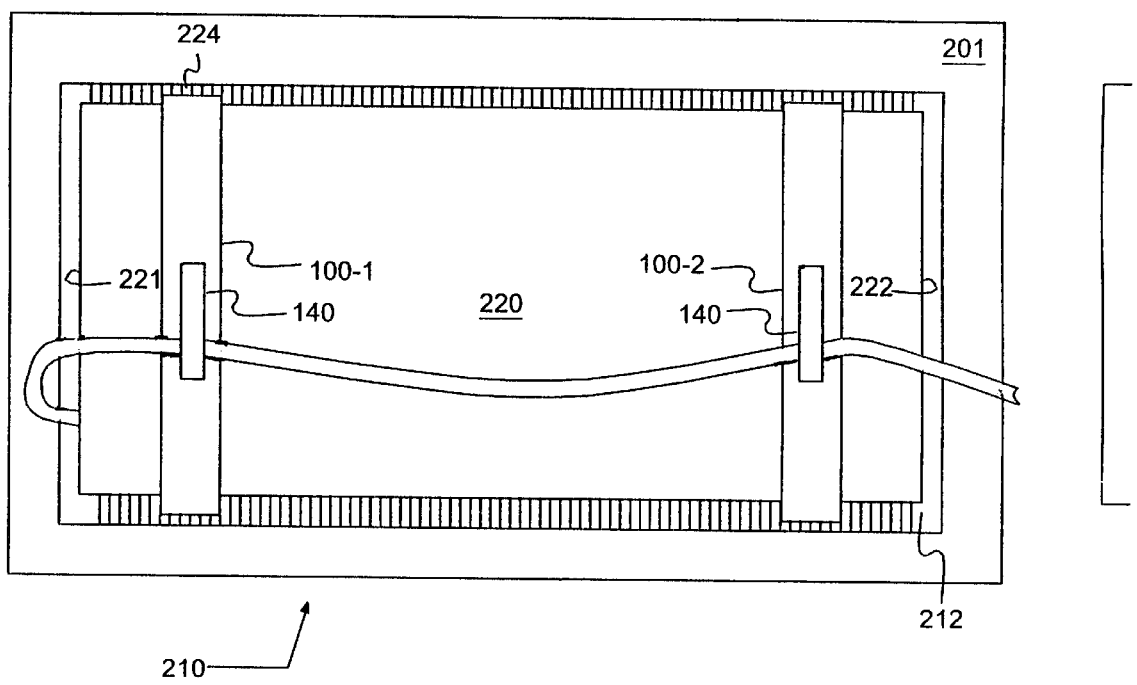
FIG. 3 is a rear view illustrating a data processing system in which the system box is hung from the display terminal cabinet via a pair of retention hangers according to the present invention.

Data processing system 200 according to the present invention further includes at least one, and more preferably, two or more retention hangers 100 as described above. In one embodiment, as depicted in FIG. 3, the data processing box 220 is received within a pair of hangers 100, where the hangers are displaced from each other such that a first hanger 100-1 is proximal to a first end 221 of the data processing box 220 while a second hanger 100-2 is proximal to a second end 222 of data processing box 220. The hook 120 (not shown in FIG. 3) of each hanger 100 is received in a groove 224 in the display monitor cabinet 201. In this arrangement, the data processing box 220 is suspended in close proximity to a rear surface 212 of display monitor 210. In embodiments of hangers 100 that include latches 130, the latches 130 (not shown in FIG. 3) are secured to the display monitor cabinet 201 to prevent hangers 100 and data processing box 220 from pivoting about the hooks 120.

It will be apparent to those skilled in the art having the benefit of this disclosure that the present invention contemplates a device enabling a network computer box to be suspended from its display terminal to minimize the desk top area required for the system. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. A hanger apparatus for suspending a data processing box, comprising:

a hanger frame comprising a pair of substantially parallel major sides and a pair of substantially parallel minor sides connecting the pair of major sides at their respective ends, wherein the frame defines a substantially rectangular aperture dimensioned approximately equal to dimensions of the data processing box such that the hanger apparatus may engage the data processing box; and a hook connected to the frame and configured to engage a display monitor thereby suspending the hanger frame above a surface on which the display monitor is located such that the data processing box, when received within the hanger frame, is vertically displaced above the surface on which the display monitor is located; and wherein the hanger apparatus is manually removable from both the display monitor and the data processing box.

2. The apparatus of claim 1, wherein the hanger apparatus further includes a latch proximal to the second minor side and in close proximity to the display monitor when the hanger apparatus suspends from the hook, wherein the latch is enabled to secure the hanger apparatus to the display monitor.

3. The apparatus of claim 2, wherein the latch includes a tongue affixed to a base piece wherein the base piece is movably affixed to the retention apparatus, wherein movement of the base piece when the apparatus is in close proximity to a rear face of the display monitor facilitates snapping the tongue into a groove in the rear face of the display monitor.

4. The apparatus of claim 3, wherein moving of the latch base piece is facilitated by an extension flange affixed to the base piece.

5. The apparatus of claim 1, further comprising cable management means affixed to the second major side of the apparatus.

6. The apparatus of claim 5, wherein the cable management means comprises a hook integrated with the second major side of the apparatus.

7. The apparatus of claim 1, wherein the first major side of the apparatus includes at least one bumper protrusion, wherein the bumper protrusion maintains separation between the data processing box and the display monitor when the data processing box is received within the retention apparatus and the retention apparatus is suspended from the groove in the video display.

8. The apparatus of claim 1, wherein the apparatus comprises molded plastic.

9. A data processing system, including:
 a substantially rectangular data processing box;
 at least on e hanger apparatus comprising:
  a hanger frame comprising a pair of substantially parallel major sides and a pair of substantially parallel minor sides connecting the pair of major sides at their respective ends, wherein the frame defines a substantially rectangular aperture dimensioned approximately equal to dimensions of the data processing box such that the hanger apparatus may engage the data processing box; and
  a hook connected to the frame and configured to engage a display monitor thereby suspending the hanger frame above a surface on which the display monitor is located such that the data processing box, when received within the hanger frame, is vertically displaced above the surface on which the display monitor is located;
 wherein the hanger apparatus is manually removable from both the display monitor and the data processing box; and
 the display monitor including a recess suitable for receiving the hanger apparatus hook.

10. The system of claim 9, wherein the hanger apparatus further includes a latch in close proximity to the display monitor when the hanger apparatus suspends from the hook, wherein the latch is configured to secure the retention apparatus to the display monitor.

11. The system of claim 10, wherein the latch includes a tongue affixed to a base piece wherein the base piece is movably affixed to the hanger apparatus, wherein movement of the base piece when the apparatus is in close proximity to a rear face of the display monitor facilitates snapping the tongue into a groove in the rear face of the display monitor.

12. The system of claim 11, wherein moving of the latch base piece is facilitated by an extension flange affixed to the base piece.

13. The system of claim 9, further comprising cable management means affixed to the second major side of the hanger frame.

14. The system of claim 13, wherein the cable management means comprises a hook integrated with the second major side of the hanger apparatus.

15. The system of claim 9, wherein the first major side of the apparatus includes at least one bumper protrusion, wherein the bumper protrusion maintains separation between the data processing box and the display monitor when the data processing box is received within the retention apparatus and the retention apparatus is suspended from the groove in the display monitor.

16. The system of claim 9, wherein the hanger apparatus is comprised of molded plastic.

17. The system of claim 9, wherein the system includes a first hanger apparatus and a second hanger apparatus displaced from the first hanger apparatus such that the first hanger apparatus is proximal to a first end of the data processing box while the second hanger apparatus is proximal to a second end of the data processing box.

* * * * *